(No Model.)

S. LIGHTBURNE, Jr.
COUPLING.

No. 263,415. Patented Aug. 29, 1882.

Witnesses:
Geo. H. Strong
S. H. Nourse

Inventor,
S. Lightburne Jr.
By Dewey & Co.
Attorneys

UNITED STATES PATENT OFFICE.

STAFFORD LIGHTBURNE, JR., OF SAN FRANCISCO, CALIFORNIA.

COUPLING.

SPECIFICATION forming part of Letters Patent No. 263,415, dated August 29, 1882.

Application filed May 2, 1882. (No model.)

*To all whom it may concern:*

Be it known that I, STAFFORD LIGHTBURNE, Jr., of the city and county of San Francisco, State of California, have invented an Improved Coupling; and I hereby declare the following to be a full, clear, and exact description thereof.

My invention relates to a device or attachment which is especially useful for making a water-tight connection with the smooth ends of pipes, bibs, or basin-cocks, and which is so constructed that it will fit pipes of different sizes.

It consists of a peculiarly-shaped elastic joint-former, which is inclosed within a case. The case is so formed as to slip upon the end of the pipe or cock, and is secured there by a set-screw or other suitable device. The lower end of this case is provided with any suitable coupling for making connections with filters or other connections, and its end is grooved or recessed to receive the edge of the elastic packing, so as to give more spring and preserve the shape of packing to make a tight joint with the opposite coupling end, as will be more fully explained by reference to the accompanying drawings, in which—

Figure 1:
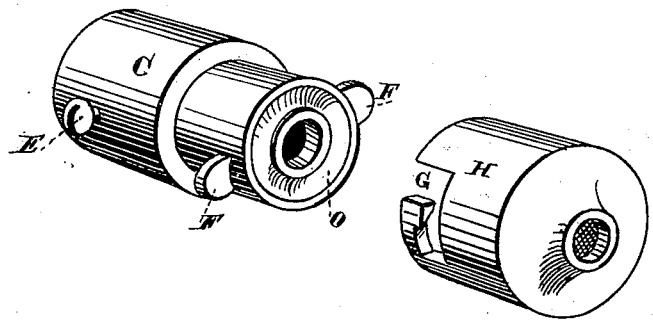
Figure 2:
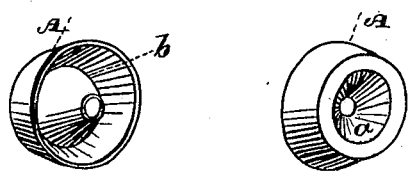
Figure 3:
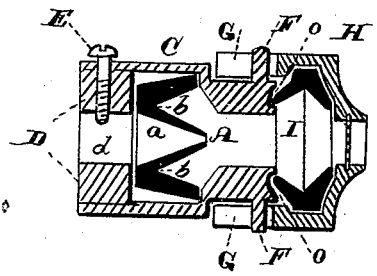

Figure 1 is a perspective view of my device. Fig. 2 is a view of rubber packing. Fig. 3 is a section.

A is the elastic packing-ring, which is designed to form a water-tight joint with the end of the pipe or faucet. This ring is made preferably of rubber and of the shape shown in Fig. 2, with a conical depression, *a*, into which the end of the faucet or pipe enters, passing through a hole in the bottom of the cone, so that the sides of the depression then press against it and prevent any escape of water when it is in place. The opposite side of the ring has a depression, *b*, made in it of a V shape and surrounding the conical depression *a*, there being a thin wall of rubber between them, which allows faucets of different sizes to be introduced. This elastic ring is fitted into a cylindrical case, C, and as its sides are slightly cone-shaped it fits tightly and the pressure of water within the V-shaped depression *b* will press the sides against the case, so that it will always be water-tight. Above this ring A is fixed a bushing, D, within the cylinder C. A hole, *d*, is made through this bushing, and it may then be slipped upon the pipe until the end of the pipe fits snugly within the depression *a* of the elastic ring A. By turning a set-screw, E, against the pipe or faucet it will be held firmly in place.

In order to couple anything to this device—such as another pipe or a filter—the lower end of the case C is reduced as shown and may have lugs F projecting from its sides, these lugs entering corresponding slots, G, in the end of the opposite coupling, H, or any other suitable locking device may be used. Within this coupling H may be fixed a packing-ring, I, similar to that shown in my patent of March 28, 1882, and below this may be fixed a strainer or filter; or there may be simply a pipe or hose connection, if desired.

In order to make a tight joint between the end of the cylinder or section C and the packing-ring I, the end of the section C is grooved, as shown at *o*, and the convex edge of the ring fits into this groove, so that when the pressure of the water comes upon it it forces this edge closely against the groove, and thus makes a tight joint.

By this device I am enabled to make a water-tight connection with any smooth pipe, bib, or faucet, the peculiar shape of the ring A allowing it to fit and adapt itself to any sized faucet or pipe end within its range.

Having thus described my invention, what I claim as new, and desire to secure by Letters Patent, is—

1. A means for forming a tight joint with smooth pipes or faucets, consisting of the section C, having one end perforated to receive the faucet end, in combination with the elastic ring A, with its conical and V-shaped depressions upon opposite sides, respectively, substantially as herein described.

2. The male end C of a coupling or faucet, having its end provided with the lugs F and grooved on its end, as shown at *o*, in combination with the corresponding coupling end, H, having the elastic packing-ring I, the convex edges of which fit the groove *o* when the two parts are locked together, substantially as herein described.

3. A coupling device for smooth pipes or faucets, consisting of the section C and the contained elastic ring A, as shown, in combination with a removable perforated bushing, D, to fit the end of the pipe or faucet, substantially as herein described.

In witness whereof I have hereto set my hand.

STAFFORD LIGHTBURNE, Jr.

Witnesses:
S. H. NOURSE,
LEE D. CRAIG.